April 12, 1955  R. M. SCOTT  2,706,285
DYNAMIC MONITOR FOR ECHO RANGING EQUIPMENT
Filed Aug. 21, 1951  4 Sheets-Sheet 1

INVENTOR
RODERIC M. SCOTT
BY
ATTORNEY

INVENTOR
RODERIC M. SCOTT
BY
ATTORNEY

INVENTOR
RODERIC M. SCOTT
BY
ATTORNEY

ECHO RANGE TIME DELAY CIRCUIT 27

SWITCHING TUBE CIRCUIT 30

United States Patent Office 2,706,285
Patented Apr. 12, 1955

2,706,285

DYNAMIC MONITOR FOR ECHO RANGING EQUIPMENT

Roderic M. Scott, Stamford, Conn., assignor to the United States of America as represented by the Secretary of the Navy Application August 21, 1951, Serial No. 242,960

8 Claims. (Cl. 340—3)

The present application is a continuation-in-part of patent application, Serial No. 629,163 for Dynamic Monitor for Echo Ranging Apparatus, filed by Roderic M. Scott on November 16, 1945, now abandoned.

The present invention relates to a monitor for examining the operation of underwater echo ranging apparatus, and more particularly for examining the operation of underwater echo ranging equipment while in normal operation.

Monitor equipment has been available in the past which analysed the operation of the individual components of echo ranging equipment, but none of these monitors has measured the response of the equipment in its normal operation. The present invention is placed in the water at a known distance from the transducer of the echo ranging equipment, and the ping or burst of sound energy transmitted by the echo ranging equipment actuates the monitor to emit an echo ping which is received by the echo ranging equipment in the same manner as an echo reflected from a target.

The efficiency of underwater echo ranging equipment is affected by the mounting of the equipment and by the condition and location of the transducer. The frequency of operation of the equipment has a large effect on the efficiency and sensitivity of the transducer, and it is therefore highly desirable to measure the sensitivity of the equipment at its particular operating frequency. The length of the ping effects the reverberation of the sound energy in the water, and the length of the ping from the monitor should be the same as that of the ping from the equipment.

It will be readily apparent that the strength of the echo from a given target is directly related to the power transmitted by the echo ranging equipment, and for this reason, the operating range of the equipment is determined by the power of the equipment and the sensitivity of its receiver. The efficiency of the echo ranging equipment is determined by the ratio of the intensity of the emitted energy and the intensity of the minimum echo which may be detected. This ratio, expressed in decibels, has become known as the "figure of merit" of the echo ranging equipment, and is defined as the ratio of the intensity of the transmitted ping at a distance of one meter from the transducer to the intensity of the minimum detectable echo at the transducer.

The monitor of the present invention includes means for determining the figure of merit of the equipment in its operating condition by direct measurement, and for determining the frequency of operation, and the length of the transmitted ping from the echo ranging equipment being tested.

It is an object of the present invention to provide means for direct measurement of the figure of merit of echo ranging equipment.

It is a further object of the present invention to provide means for measuring the efficiency of echo ranging equipment under operating conditions.

It is a still further object of the present invention to provide a dynamic monitor for echo ranging equipment incorporating calibration instruments for calibration of the monitor.

Other objects and advantages of the present invention will become apparent from the following description taken in conjunction with the appended drawings in which.

Figure 1:
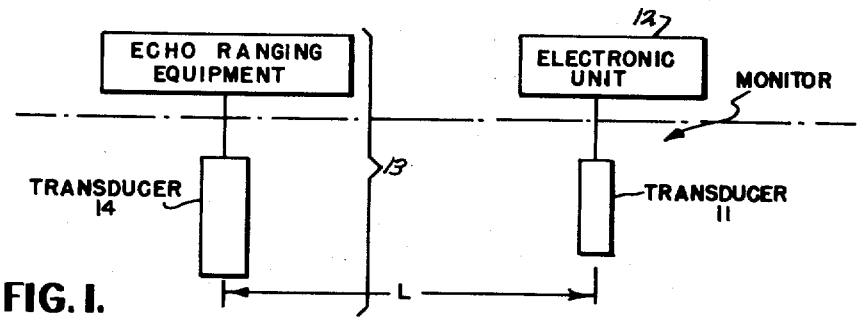
Fig. 1 is a diagrammatic illustration of the relationship between the dynamic monitor and the echo ranging equipment under test.
Figure 4:
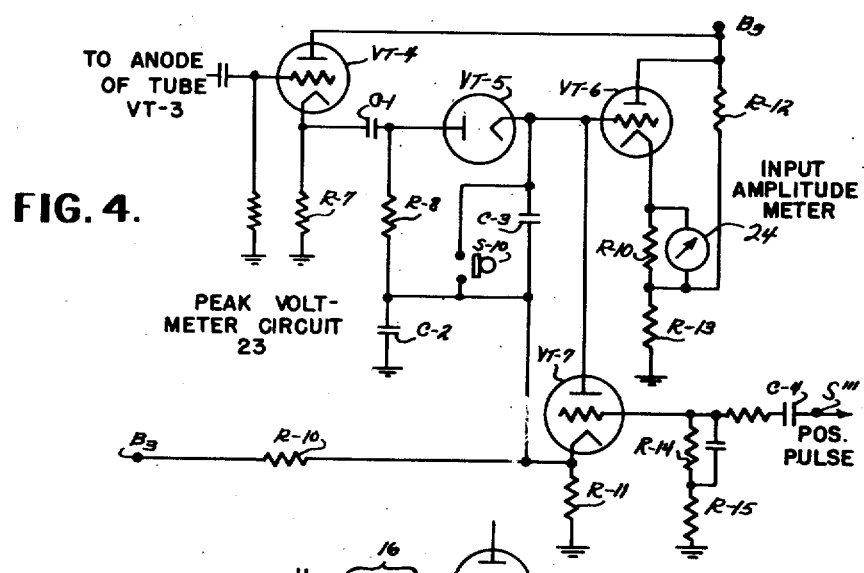
Fig. 4 is a schematic diagram of the voltmeter circuit of the present invention.

Referring now to the drawings, there is shown a diagrammatic showing of the monitor comprising the monitor transducer 11 connected to the monitor electronic unit 12 and the echo ranging equipment 13 including the transducer 14. The transducer 14 is attached to the bottom of a vessel in any conventional manner, and the monitor transducer 11 is positioned in the water at the same depth as the transducer 14 at a distance L therefrom. The distance L is relatively unimportant so long as it is known since correction therefor may be made, and the monitor transducer 11 may be suspended from the side of the vessel by means of a cable. It will be readily apparent that sound energy radiated by either transducer will impinge on the other.

Figure 2:
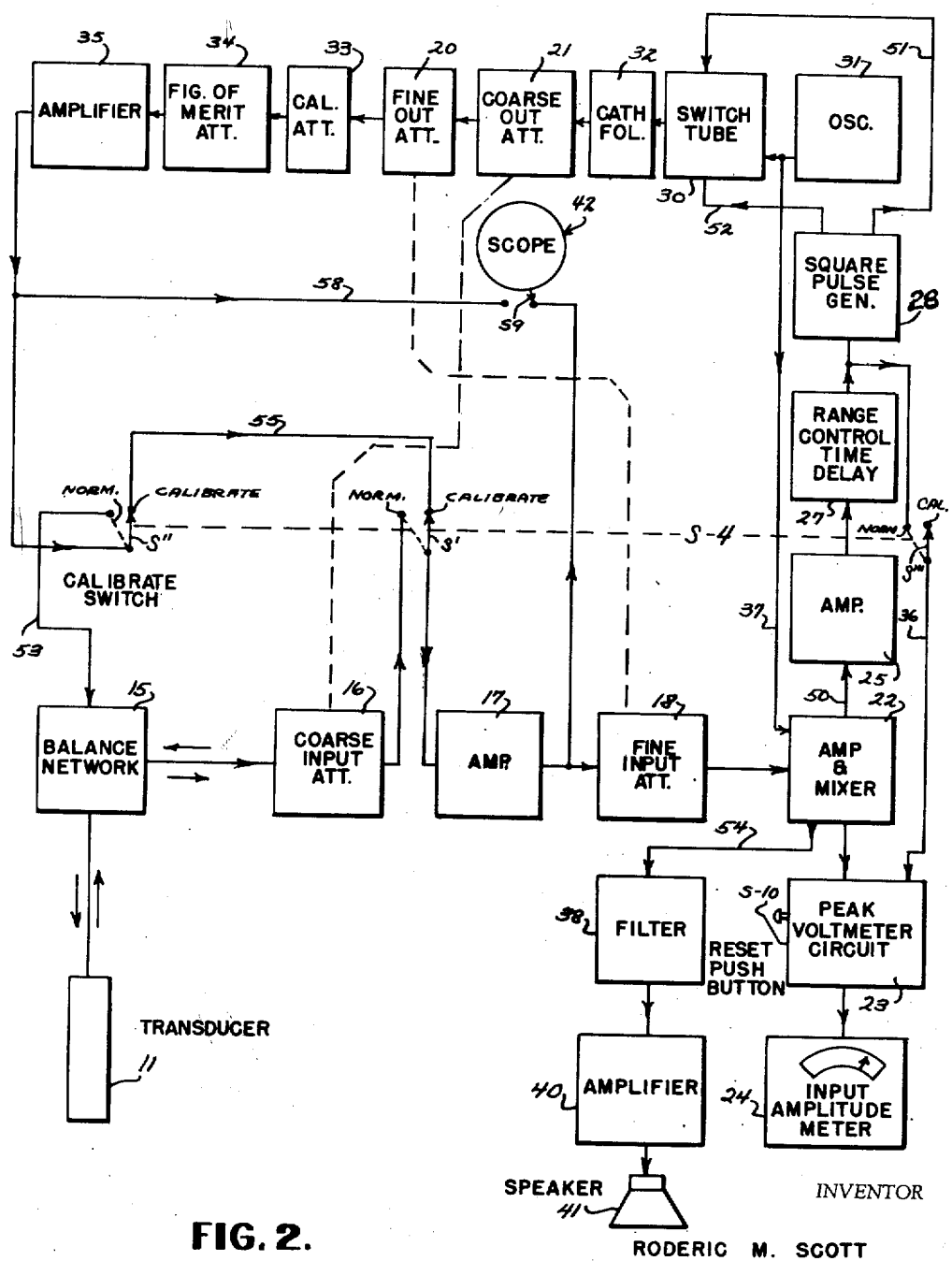
Fig. 2 is a block diagram of the monitor of the present invention.

The principle of operation of the present invention may be readily understood by reference to the block diagram in Fig. 2. Sound energy from the transducer 14 of the echo ranging equipment impinges on the monitor transducer 11 and passes through the balancing network 15 without attenuation to the coarse input attenuator 16, which attenuator is provided with a zero attenuation position and a twenty decibel attenuation position. The signal from the coarse input attenuator is amplified in the amplifier 17 and impressed on the fine input attenuator 18 having a total of forty decibel attenuation in two decibel steps. The attenuators 16 and 18 are ganged for simultaneous operation with the output attenuators 20 and 21 in a manner and for a purpose later to be described.

The signal from the fine input attenuator 18 is impressed on the amplifier and mixer 22, where the signal level is increased to a suitable level for use with the peak voltmeter circuit 23 and the input amplitude meter 24. The sound level of the signal is indicated on the input amplitude meter 24, the meter reading remaining constant for a period of time after the incoming ping from the echo ranging equipment and being returned to zero reading by the action of the circuit later to be described.

The output of the amplifier and mixer 22 is impressed on the amplifier 25, and the output of the amplifier 25 is rectified and detected to form a positive pulse of the duration of the ping. The positive pulse is used to control the echo range time delay circuit 27.

The echo range time delay circuit 27 is a one-shot multivibrator having an adjustable time delay circuit and produces a positive pulse an adjustable time after the ping from the echo ranging equipment. The positive pulse from the echo range time delay circuit 27 operates the square pulse generator 28 which is also a one-shot multivibrator having an adjustable time delay circuit and produces a positive square wave pulse and a negative square wave pulse of the same duration simultaneously. The square wave pulses are used to operate the switching tube circuit 30.

The oscillator 31 is adjustable in frequency over the same frequency range as the echo ranging equipment, and operates during the entire test, although its output to the monitor transducer 11 is controlled by the operation of the switching tube circuit 30, which is normally non-conducting. When the switching tube circuit 30 is actuated by pulses from the square wave generator 28, the output of the oscillator 31 is applied to the cathode-follower 32 which serves to isolate the oscillator and stabilize the circuit, and to the fine output attenuator 20 having a total attenuation of forty decibels in steps of two decibels and the coarse output attenuator 21 having a zero decibel attenuation position and a twenty decibel attenuation position.

The output attenuators 20 and 21 are ganged with the input attenuators 18 and 16 respectively in opposite senses as previously mentioned, in order to maintain the output of the monitor oscillator at a constant proportion of the incoming ping from the echo ranging equipment. The "calibrate" potentiometer 33 provides means for adjusting the output of the output attenuators to a value later to be described, and the output of the calibrate attenuator is impressed on the figure of merit attenuator 34. The output of the figure of merit attenuator 34 is applied to the amplifier 35, the output of which is impressed either on the balancing network 15 and the transducer 11 or to the amplifier 17 for calibration purposes.

A negative pulse from the echo range time delay circuit 27 is applied to the peak voltmeter circuit 23 by wire 36 to maintain the input amplitude meter 24 deflection after each pulse during the time interval of the echo range control circuit.

In order to provide a frequency measuring system for the echo ranging equipment under test, the oscillator 31 is calibrated. It is important that the frequency of the echo ping from the monitor be adjustable in order that the efficiency of the equipment under test is measured at the operating frequency of the equipment. In order to facilitate adjustment of the oscillator frequency to that of the echo ranging equipment, the output of the oscillator 31 is injected into the amplifier and mixer 22 by the wire 37 to produce a hetrodyne or beat note with the ping from the echo ranging equipment, the hetrodyne frequency being separated from the higher frequencies by means of the low-pass filter 38, amplified by the amplifier 40, and reproduced as sound by the loud speaker 41. The oscillator 31 may be accurately adjusted to the same frequency as the echo ranging equipment by tuning it to a zero beat by the output of the loudspeaker 41 during the received pings, or tuned to a desired low frequency note if a simulated doppler effect is desired.

By definition, the figure of merit of echo ranging equipment is the ratio of its emitted signal or ping to the minimum detactable signal. The ping from the equipment is absorbed by the water as the distance from the monitor transducer 11 from the equipment transducer 14 increases, so that the effect of that distance must be compensated for in the measurement. However, the output intensity of the monitor is not in itself important so long as its intensity is properly related to the intensity of the received ping. In order to insure the proper relationship between the received signal at the monitor and the echo ping intensity, the input attenuators 16 and 18 are adjusted to produce a predetermined deflection on the input amplitude meter 24, and operation of the input attenuators also adjusts the intensity of the echo from the monitor through the ganged connection to the output attenuators 20 and 21. When a strong ping is received, the attenuation of the incoming signal is increased while the attenuation of the monitor echo is decreased in the same proportion, thus increasing the intensity of the echo level. The actual difference between the levels of the received ping and the emitted echo from the monitor is calibrated at the time of manufacture, and remains constant over the life of the equipment, except for long time aging of the components which may be corrected by the "calibrate" attenuator 33.

After the input attenuators 16 and 18 have been adjusted to produce the predetermined deflection on the meter 24, the figure of merit attenuator 34 is set to its zero position, and the output of the amplifier 35 is impressed on the amplifier 17 by means of the calibrate switch S-4 comprising switches S′, S″, and S‴. The "calibrate" attenuator 33 is then adjusted to produce the predetermined deflection on the input amplitude meter 24, thus correcting any circuit changes since the last use of the monitor equipment.

When the calibration of the monitor is completed, the switch S-4 is returned to its normal position, and the frequency of the oscillator 31 is adjusted to zero beat with the incoming ping. The "figure of merit" attenuator 34 is tuned to its maximum attenuation value, and the attenuation reduced step by step until a barely detectable echo is received by the echo ranging equipment.

The figure of merit of the echo ranging equipment is sum of the following three quantities: the measured difference in the intensity of the input signal and the output signal of the monitor at standard conditions which is determined at the time the monitor is manufactured M, the setting of the figure of merit attenuator 34 N, and a correction for the distance separating the two transducers P, calculated by the equation:

$$P = 40 \log_{10} L$$

where $L$ = distance between transducers 11 and 14.

The oscilloscope 42 is provided in the monitor to allow a visual check on the operation of the monitor and the echo ranging equipment, and also to facilitate adjustment of the length of the echo to that of the echo ranging equipment. The switch S-9 allows the oscilloscope to be connected to either the amplifier 17 in the input of the monitor or to the amplifier 35 in the output of the monitor.

The simulated range of the echo from the monitor is regulated by adjusting the time delay of the echo range time delay circuit 27, and the length of the pulse is regulated by adjustment of the time delay of the square pulse generator 28. The range adjustment is convenient to avoid reverberation periods following the transmission of a ping and to prevent the echo ranging operator from knowing what range to expect the echo from the monitor, so that the operator must observe the indication equipment in the same way as the equipment is normally operated. The accuracy of the measurement is thereby increased.

Figure 7:
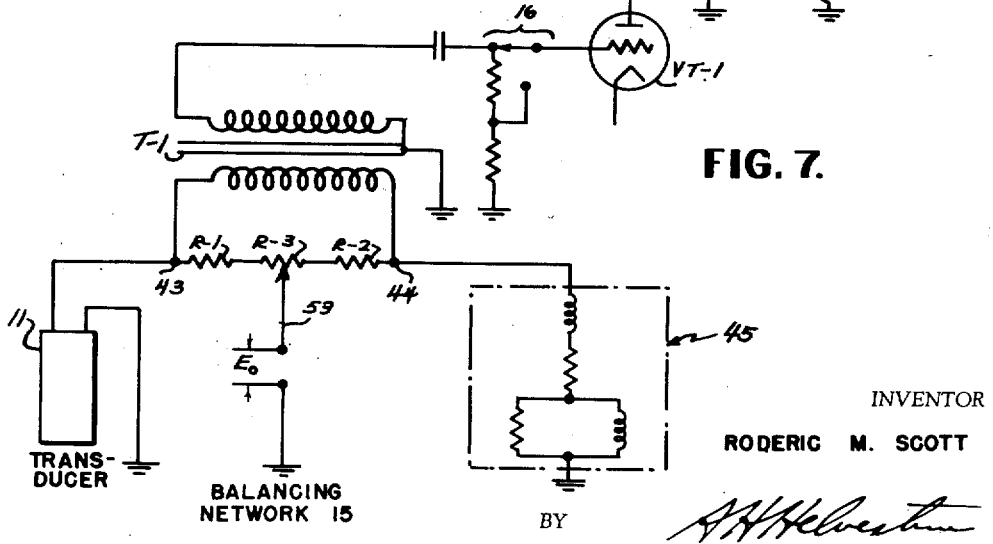
Fig. 7 is a schematic diagram of the transducer balancing network circuit of the present invention.
Figure 3:
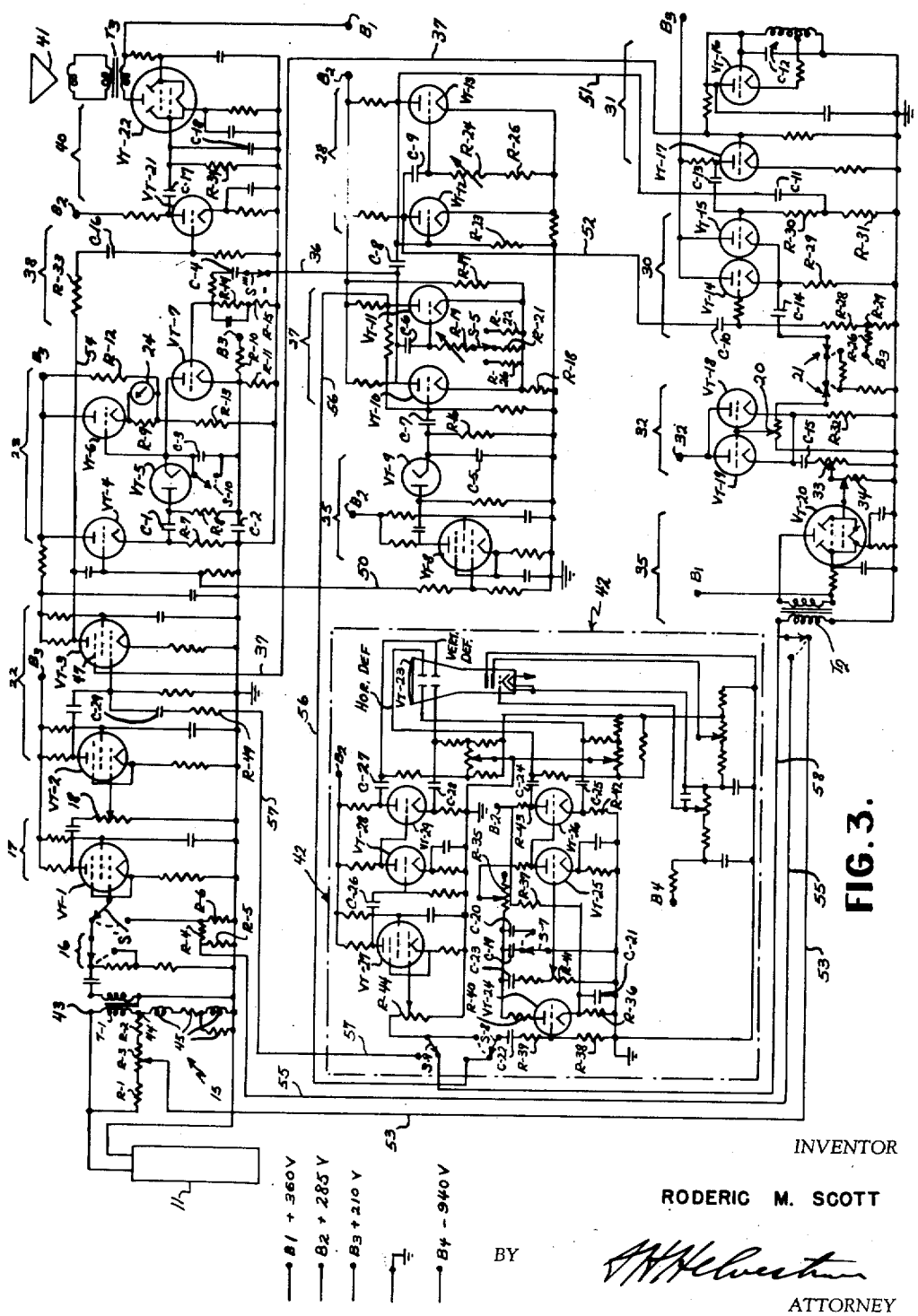
Fig. 3 is a schematic diagram of the monitor of the present invention.
Figure 5:
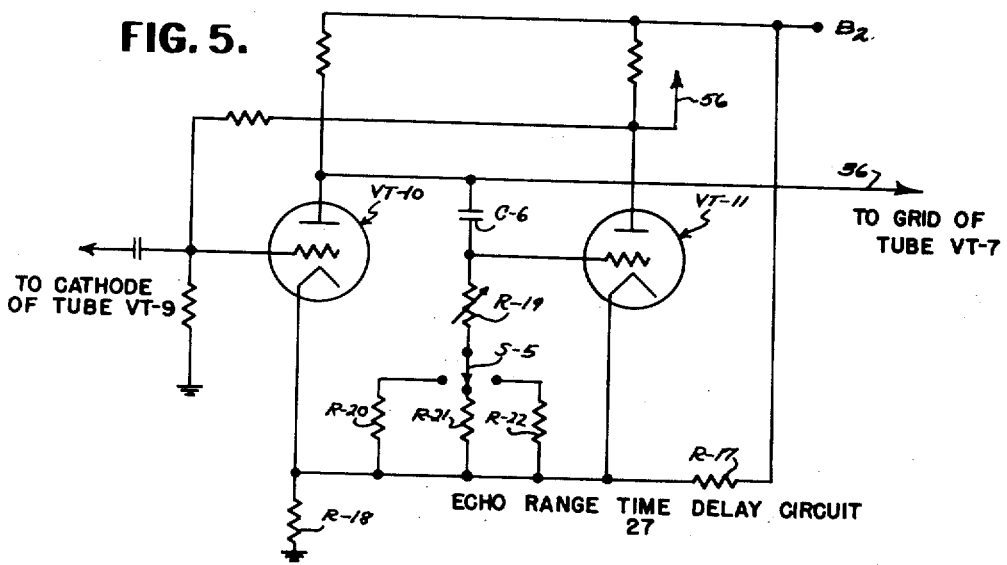
Fig. 5 is a schematic diagram of the echo range time delay circuit of the present invention.
Figure 6:
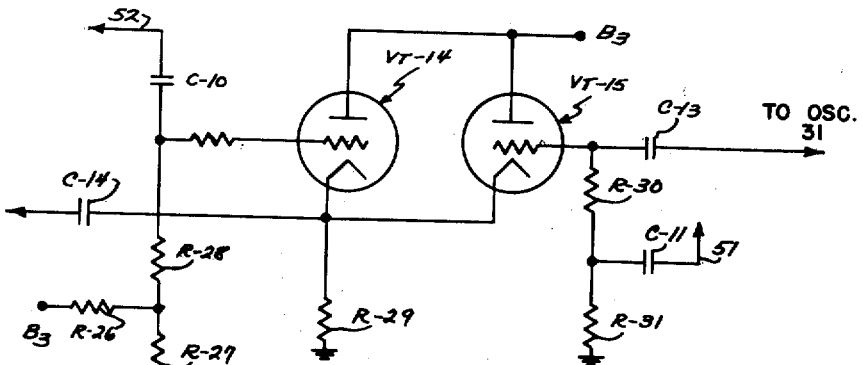
Fig. 6 is a schematic diagram of the switching tube circuit of the monitor of the present invention.

Referring now to the details of the circuit as shown in Fig. 3, the transducer 11 may be of any convenient type such as a piezoelectric crystal hydrophone which is coupled to the electronic unit 12 of the monitor through the balancing network 15. The balancing network is used to prevent energy from the amplifier 35 from entering the amplifier 17, although the transducer is connected to both at all times. As best seen in Fig. 7, the ends of the primary winding 43, 44 of the input transformer T–1 are connected to the transducer and to the impedance 45 having the same impedance as the transducer 11, so that any electrical current generated in the transducer flows through the transformer T–1 and the impedance 45 to produce a corresponding voltage in the output of the transformer. The output of the amplifier 35 is indicated by EO and is connected between ground and the electrical center of the transformer established by the resistances R–1 and R–2 connected in series with the potentiometer R–3, the potentiometer R–3 providing adjustment if needed. Thus, the voltage output of amplifier 35 is impressed equally on the ends 43, 44 of the transformer T–1 and no current flows through the winding.

The balancing network 15 provides very good separation of the input and output circuits at the frequency for which the circuit is adjusted, and adequate separation over the relatively narrow band of frequencies required from the monitor of the present invention.

The secondary of transformer T–1 is coupled to the coarse input attenuator 16 which is in turn connected to the amplifier 17 comprising the pentode tube VT–1 in a conventional circuit. Section S′ of the calibrate switch S-4 is provided to disconnect the coarse attenuator 16 from the control grid of tube VT–1 and to connect the control grid to the output of amplifier 35 for calibration purposes through resistances R–4, R–5, R–6, wire 55, and section S′ of switch S-4.

The output voltage of amplifier 17 is coupled to the fine input attenuator 18 which as previously stated can be adjusted to a total attenuation of forty decibels in two-decibel steps, the output of the attenuator being impressed on the input of the amplifier and mixer 22 comprising tubes VT–2 and VT–3. Tubes VT–2 and VT–3 are both pentodes, and the circuit of VT–2 is entirely conventional, the output thereof being coupled to the circuit of VT–3. The circuit of VT–3 is also conventional except that the suppressor grid 47 is connected to the output of the oscillator 31 through the wire 37 as previously mentioned.

The output of the amplifier and mixer 22 is coupled to the peak voltmeter circuit 23, the filter 38, and the amplifier 25. The peak voltmeter circuit comprises tubes VT–4, VT–5, VT–6, VT–7, and VT–8. Tube VT–4 is connected as a cathode follower having the resistance R–7 in its cathode circuit so that its output appears as a voltage thereacross. The voltage appearing across the resistance R–7 is coupled through the capacitors C–1 and C–2, and resistance R–8 to a diode rectifier tube VT–5 which rectifies the voltage across resistance R–7 to charge the capacitor C–3. The charge appearing on the capacitor C-3 is therefore proportional to the voltage appearing across the resistance R-7 which is in turn proportional to the signal voltage applied to the amplifier and mixer 22 from the fine input attenuator 18.

Tube VT-6 is connected as a cathode follower having a cathode resistance R-9, the grid of the tube being connected to the positive end of the capacitor C-3. The negative end of capacitor C-3 is raised above ground potential by its connection to the junction of resistances R-10 and R-11 which are connected between the anode supply B3 and ground, and the cathode resistance R-9 is raised above ground potential by the resistance R-12 and R-13 also connected between the anode supply B3 and ground. The voltage between the junction of resistances R-10 and R-11 and the junction of resistances R-12 and R-13 is proportioned to bias tube VT-6 to barely prevent conduction therethrough when the capacitor C-3 is discharged.

The conduction of tube VT-6 creates a voltage across the resistance R-9 which is proportional to the voltage across the capacitor C-3, and this voltage across the resistance R-9 is measured by the input amplitude meter 24. The input amplitude meter 24 retains its deflection for a considerable period of time, since there is no discharge path for the capacitor C-3 except through the normally non-conducting tube VT-7 having its cathode connected to the negative end of capacitor C-3, its anode connected to the positive end of capacitor C-3, and its grid connected to ground through the resistances R-14 and R-15. It will be remembered that the voltage of the negative end of capacitor C-3 is raised above ground potential by its connection to the resistance R-10 and R-11, so that the tube is normally biased beyond cut-off.

A positive pulse is applied to the grid of tube VT-7 through the wire 36 and capacitor C-4 from the echo range time delay circuit 27 to discharge capacitor C-3 and return the input amplitude meter 24 to to zero as hereinafter explained. A time delay of a second or more is afforded by the echo range time delay circuit 27 so that adequate time is allowed to note the deflection of the meter.

The output of tube VT-3 is also impressed on the amplifier 25 which comprises the pentode amplifier tube VT-8 in a conventional circuit and diode rectifier VT-9. The voltage appearing at the output of tube VT-8 is rectified and detected to form a positive-going pulse having the shape of the envelope of the incoming ping from the echo ranging equipment across the capacitor C-5. The resistance R-16 provides a leakage path for capacitor C-5.

The positive pulse on capacitor C-5 is employed to trigger the echo range time delay circuit 27 comprising tubes VT-10 and VT-11 in a one-shot multivibrator circuit. Tube VT-10 is normally cut off, since its grid is connected to ground and its cathode is connected to the junction of a voltage divider comprising resistances R-17 and R-18 connected between B-2 and ground, and the current conducted by the tube VT-11 increases the bias of tube VT-10. The capacitor C-6 becomes charged to the potential between the anode and cathode of tube VT-10. When the positive pulse from capacitor C-5 is impressed on the grid of tube VT-10 by the coupling capacitor C-7, tube VT-10 is rendered conducting and tube VT-11 is cut off by the decrease in the anode voltage of tube VT-10 through the capacitor C-6. The discharge path for capacitor C-6 includes the variable resistance R-19, the range switch S-5 and one of resistances R-20, R-21 and R-22, the resistance of the discharge path determining the time interval during which tube VT-11 is cut off. When condenser C-6 discharges sufficiently to allow tube VT-11 to conduct, the voltage drop across resistance R-18 again cuts tube VT-10 off and the circuit is returned to its original condition.

The time delay afforded when switch S-5 connecting R-20 in the discharge path of capacitor C-6 corresponds to simulated ranges between 200 and 1100 yards, one second corresponding to a range of 800 yards. The remaining positions of switch S-5 correspond to simulated ranges of from 1100 to 2200 yards and from 2100 to 2900 yards respectively, the variable resistance R-19 serving as a vernier range to provide intermediate adjustment of the time delay.

The voltage at the anode of VT-10 is therefore a negative-going square wave voltage pulse starting at the time the positive pulse from capacitor C-5 is applied to the grid thereof and continuing until the tube VT-10 is cut off following the discharge of capacitor C-6. The voltage pulse from the anode of tube VT-10 is applied by the wire 36 as previously explained to the grid of tube VT-7 the capacitor C-4 and resistances R-14 and R-15 serving to differentiate the pulse to produce a short negative pulse at the beginning of the voltage pulse and a short positive pulse at the end of the voltage pulse. Since tube VT-7 is already biased to cut-off, the negative pulse has no effect, but the positive pulse renders the tube conducting to discharge the condenser C-3.

The voltage pulse from the anode of tube VT-10 is impressed on the square pulse generator 28 through the coupling capacitor C-8 which with the resistance R-23 forms a differentiating network to produce a negative pulse at the beginning of the voltage pulse and a positive pulse at the end thereof. The positive pulse actuates the square pulse generator 27 which comprises the tubes VT-12 and VT-13 in a one-shot multivibrator circuit very similar to the echo range time delay circuit 27 previously described, the tube VT-12 being normally non-conducting and the tube VT-13 being normally conducting. When the positive pulse from the capacitor C-8 is applied to the grid of tube VT-12 to render that tube conducting, the tube VT-13 is rendered non-conducting for a period of time determined by the capacitance of capacitor C-9 and the resistance of resistances R-24 and R-25, the resistance R-24 being variable to provide a pulse length adjustment of from 5 to 130 milliseconds duration. The anode voltage of tube VT-12 decreases when tube V-11 is rendered conducting, while the anode voltage of tube VT-13 increases at the same time, so that tube VT-12 produces a negative pulse while the tube VT-13 produces a simultaneous positive pulse of the same duration.

The positive and negative pulses from tubes VT-13 and VT-12 respectively are impressed on the switching tube circuit 30 by wires 51 and 52, which circuit comprises tubes VT-14 and VT-15. Tube VT-14 is normally positively biased by means of resistances R-26 and R-27 connected between anode supply B-3 and ground, and grid resistance R-28 connected to the junction of resistances R-26 and R-27. The current conducted by tube VT-14 through the common cathode resistor R-29 produces a high negative bias on the grid of tube VT-15 to render tube VT-15 unresponsive to signals impressed on its grid, the grid being connected to ground by the resistances R-30 and R-31. The negative pulse from tube VT-12 is impressed on the grid of tube VT-14 through wire 52 and coupling condenser C-10 to reduce conduction of tube VT-14, and at the same time the positive pulse from tube VT-13 is impressed on the junction of resistances R-30 and R-31 by wire 51 and coupling capacitor C-11 to reduce the negative bias on the grid of tube VT-15 sufficiently to render tube VT-15 responsive to signals impressed on its grid from oscillator 31. Proper proportioning of resistances R-26 and R-27 prevents any change in current through resistance R-29, so as to prevent any direct current component in the output.

The oscillator 31 comprises tube VT-16 in a conventional Hartley circuit, its frequency being controlled by the condenser C-12 which is calibrated. The output of the oscillator is applied to the resistance-coupled amplifier comprising tube VT-17, and the output of tube VT-17 is impressed on the suppressor grid of tube VT-3 by wire 37 as previously explained. The output of tube VT-17 is also impressed on the grid of tube VT-15 through the coupling capacitor C-13.

The output of tube VT-15 is therefore a pulse of energy having the frequency of the oscillator 13 and the duration of the pulses from the square wave generator 28. The time delay for emission of the pulse from tube VT-15 after the arrival of the ping from the echo ranging equipment is determined by the time delay of echo range time delay circuit 27.

The output of the switching tube circuit 30 is coupled through the capacitor C-14 to coarse output attenuator 21 which produce no attenuation in one position and twenty decibel attenuation in the other. The output of the coarse output attenuator 21 is impressed on the fine output attenuator 20 which also functions as the grid resistance of the cathode follower circuit 32 comprising the tubes VT-18 and VT-19 connected in parallel with each other and having the common cathode resistance R-32. The output of the cathode follower circuit 32 is coupled through capacitor C-15 to the calibrate attenuator 33.

The cathode follower circuit (VT-18 and VT-19) is employed to prevent energy from the transducer 11 being fed through the amplifier 35 in the reverse direction and to insure stability in the oscillator output by the degeneration induced by the cathode resistance R-32. Adequate amplification is provided to off-set the loss in gain of the cathode follower in the circuit.

The output of the calibrate attenuator 33 is impressed on the figure of merit attenuator 34, and the output of the figure of merit attenuator is used to excite amplifier 35 comprising tube VT-20 which is a beam power tube coupled to the balancing network 15 through transformer T-2, and the wire 53.

The output voltage from tube VT-3 of the amplifier and mixer 22 contains the frequency of the ping from the echo ranging equipment, the frequency of the oscillator 31, and the sum and difference of the two. This output voltage is impressed on the resistance-coupled amplifier tube VT-21 through wire 54, the resistance R-33 and capacitor C-16, which coupling arrangement emphasizes the lower frequencies over the higher frequencies. The output of tube VT-21 is impressed on beam power tube VT-22 through coupling capacitor C-17, grid resistance R-34, and by-pass capacitor C-18 which by-passed higher frequencies to ground and further attenuates higher frequencies, so that the signal impressed on tube VT-22 is predominantly the difference frequency between the frequency of the ping and the frequency of the oscillator 31. The output of tube VT-22 is coupled to a loud speaker 41 through output transformer T-3 in conventional fashion.

The calibrate switch S-4, as previously mentioned comprises sections S', S'' and S'''. Section S' is connected between the coarse input attenuator 16, the grid of tube VT-1, and wire 55. In the normal position, the input attenuator is connected to the grid of tube VT-1, while in the calibrate position, the grid of tube VT-1 is connected to wire 55. Section S'' is simultaneously thrown to disconnect the output transformer T-2 from the balancing network 15 and wire 53 and to connect it to wire 55. The remaining section S''' acts to disconnect wire 36 from the grid of tube VT-7 in the calibrate position.

The oscilloscope 42 comprises a cathode ray tube VT-23 with a horizontal sweep generator and a vertical amplifier. The horizontal sweep generator comprises thyratron tube VT-24, amplifier tube VT-25, and paraphase amplifier tube VT-26. The thyratron tube is connected in parallel with one of capacitors C-19 or C-20 selectable by switch S-7 to provide a coarse adjustment in the sweep frequency, the variable charging resistance R-35 serving as a fine frequency adjustment. Condenser charging circuit (C-19 or C-20 with R-35) is connected between anode power source B2 and ground. The bias voltage of thyratron tube VT-24 is determined by the series resistances R-36 and R-37 connected to anode power source B2, resistance R-36 being by-passed by capacitor C-21 and the cathode connected to the junction of the resistances.

Resistance R-38 is connected between the grid of tube VT-24 and ground, the grid being connected to the external synchronize switch S-8, ganged to switch S-7, through resistance R-39 and capacitor C-22. Resistance R-40 is connected in series with the anode-cathode circuit of tube VT-24 to limit the current therethrough.

Capacitor C-19 provides a sweep frequency of from 2 to 10 kilocycles per second while capacitor C-20 provides a sweep frequency of from 7 to 125 cycles per second. When the selected capacitor has become charged to the ionization voltage of tube VT-24, that tube becomes conductive and rapidly discharges the capacitor to produce a saw-tooth voltage, which voltage is impressed on tube VT-25 through coupling capacitor C-23 and horizontal width control R-41. The tube VT-25 is a conventional resistance-coupled amplifier except it is directly connected to the paraphase amplifier tube VT-26 having equal cathode and anode resistance R-42 and R-43. The horizontal deflecting plates of cathode ray tube VT-23 are coupled to the anode and cathode of tube VT-26 through coupling capacitors C-24 and C-25 respectively.

The input to the vertical amplifier comprising tubes VT-27, VT-28 and VT-29 is connected through the input switch S-9 and to the vertical height control R-44 and to the grid of pentode amplifier tube VT-27. The circuit of amplifier tube VT-27 is entirely conventional, the output thereof being coupled to the grid of tube VT-28 through coupling capacitor C-26. The amplifier tube VT-28 and the paraphase amplifier tube VT-29, like tubes VT-25 and VT-26, are direct connected, and the two outputs of tube VT-26 are coupled to the vertical deflection plates of cathode ray tube VT-35 through capacitors C-27 and C-28.

The usual focus control, brightness control, and centering controls are included, as in the power supply. However, these components are entirely conventional, and therefore not further described.

In the slow sweep position of switch S-8, the external synchronized voltage for the horizontal sweep circuit is provided from the anode of tube VT-11 of the echo range time delay circuit 27 by the wire 56, capacitor C-22 serving to differentiate the positive pulse from tube VT-11 into a positive pulse occurring at the time of arrival of the ping from the echo ranging equipment and a negative pulse at the time tube VT-11 again becomes conducting after actuation of the echo ranging circuit 27 by the ping. The negative pulse has no effect on the operation of the sweep circuit, but the positive pulse initiates a sweep of the cathode ray tube VT-23 upon the arrival of the ping from the echo ranging equipment.

In the fast sweep position of external synchronize switch S-8, and range switch S-7, the sweep generator is synchronized from the signal impressed on the vertical amplifier.

The switch S-9 is arranged to connect the input of the vertical amplifier of the oscilloscope 42 to the output of the monitor by means of wire 58 connected to the secondary of output transformer T-2 or to the input of the monitor by means of wire 57 coupled to the anode of tube VT-2 through resistance R-45 and coupling capacitance C-29. By switching the oscilloscope input from the input of the monitor to the output of the monitor, the operator is enabled to observe the shape and duration of both the incoming ping from the echo ranging equipment and the echo from the monitor, and may readily adjust the duration of the echo to that of the received ping.

The normally open push-button switch S-10 is provided to manually discharge capacitor C-3 as required for the operation of the monitor.

The power supply for the monitor is of conventional design and is not illustrated, since it forms no part of the present invention. There are provided an unregulated source of direct current at 360 volts, B1; an unregulated direct current source at 285 volts, B2; a regulated direct current source at 210 volts, B3; and a negative source of direct current for the cathode ray tube VT-23 at 940 volts below ground potential, B4. In addition, the usual sources of heater power for the several tubes are provided.

The direct current source B1 supplies the anode power to tubes VT-20 and VT-22, while the direct current source B2 supplies the anode power to tubes VT-8, VT-10, VT-11, VT-12, VT-13, VT-18, VT-19, VT-21, VT-24, VT-25, VT-26, VT-27, VT-28, and VT-29. The regulated source B3 supplies anode power for tubes VT-1, VT-2, VT-3, VT-4, VT-6, VT-14, VT-15, VT-16, and VT-17. Tubes VT-5, VT-7, and VT-9 are employed for special purposes and require no anode power. Power for the cathode ray tube VT-23 is supplied from negative power source B4.

The use of the monitor will now be explained in detail. The monitor is installed in any convenient location on the ship and the transducer 11 lowered into the water to the same depth as the transducer 14 at a known distance therefrom. The distance between the transducers can be easily obtained from the plans of the ship if necessary. The echo ranging equipment is then keyed and the input attenuators 16 and 18 adjusted to produce the predetermined calibration deflection on the input amplitude meter 24, and the frequency of the oscillator 31 is adjusted to zero beat with the incoming pings. The level of the echo from the monitor is automatically adjusted through the ganged input and output controls.

The figure of merit attenuator 34 is set to zero attenuation and immediately after a ping from the echo ranging equipment is received, the calibration switch S-4 is thrown to its calibrate position. At the same time, the push-button switch S-10 is pushed to reset the input amplitude meter 24 to zero. The received ping then actuates the monitor to emit a pulse of electrical energy from the output transformer T-2 which is now applied over wire 55 to the amplifier 17 and thence to the input amplitude meter and the echo range time delay circuit 27. The monitor then continues to actuate itself to emit energy pulses at regular intervals until the calibrate switch S-4 is returned to its normal position. The calibrate potentiometer 33 is adjusted to produce the same predetermined deflection on the input amplitude meter 24 to which the level of the input was adjusted which completes the calibration of the monitor. The calibration switch S-4 is then returned to normal. The duration of the echo from the monitor is adjusted to that of the ping from the echo ranging equipment by switching the oscilloscope 42 back and forth between the input end and the output end of the monitor by means of switch S-9 to sequentially display the incoming ping and the monitor echo on the cathode ray tube VT-23, and adjusting the setting of variable resistance R-24 in the square pulse generator 28 until the duration of the two coincide.

The figure of merit attenuator 34 is now turned to its maximum attenuator position and the echo range time delay circuit 27 is adjusted to a convenient point in the range scale being employed by the echo ranging equipment. The echo ranging equipment is keyed and the figure of merit attenuator 34 shifted step by step to increase the strength of the echo until it is detectable by the operator.

The figure of merit of the echo ranging equipment is determined by adding the three components as previously explained. The constant M, of the monitor varies with the frequency and is calibrated over the range of the oscillator 31, and a curve drawn of the function. Once the monitor has been initially calibrated at manufacture, no further determination of the constant is required, since variations over a period of time are corrected by adjustment of the calibrate attenuator 34 at the time the monitor is installed for test.

By operating the echo ranging equipment at several points in its frequency range and determining the figure of merit at each point, the operator may readily determine the most efficient operating frequency for his equipment. The effect of adjustments to the equipment may also be readily determined by measurement of the figure of merit before and after the adjustment.

It will be readily apparent that many changes may be made in the monitor equipment described without departing from the spirit of the invention disclosed, and it is intended to cover such modifications as are encompassed by the appended claims.

What I claim is:

1. A device to determine the relative efficiency of an echo-ranging apparatus including, means to receive and measure an energy pulse transmitted by said apparatus, means actuated by a received pulse to return an energy pulse to said apparatus, means to regulate the intensity of the returned pulse to the minimum value thereof detectable by said apparatus, and means indicating relative magnitudes of said received and returned pulses, whereby the ratio between the transmitted energy and the minimum detectable energy received by said echo-ranging apparatus may be established.

2. Apparatus in accordance with claim 1 which includes means to compare visually the duration of the received and returned pulses.

3. Apparatus in accordance with claim 2 which includes means to render the received and returned pulses audible.

4. Apparatus in accordance with claim 2 which includes means to adjust the frequency of the returned pulse.

5. In a device to determine the relative efficiency of an echo-ranging apparatus, means to receive and attenuate to a predetermined level an energy pulse transmitted by said apparatus, means actuated by a received pulse to return an energy pulse to said apparatus, and means to regulate the intensity of the returned pulse by a measured amount to a level barely detectable by said apparatus, whereby the ratio between the transmitted energy and the minimum detectable energy received by said echo-ranging apparatus may be established.

6. A device to determine the relative efficiency of an echo-ranging apparatus including, means to receive and attenuate to a predetermined level an energy pulse transmitted by said apparatus, means actuated by a received pulse to return an energy pulse to said apparatus, means to attenuate the energy of said returned pulse, said attenuator being controlled simultaneously with the receiving attenuator, a separate attenuator in said pulse returning means to regulate the intensity of the returned pulse to a minimum level detectable by said apparatus, and means indicating relative energies in said transmitted and returned pulses, whereby the ratio between the transmitted energy and the minimum detectable energy received by said echo-ranging apparatus may be established.

7. A device to determine the relative efficiency of an echo-ranging apparatus including means to receive and measure an energy pulse transmitted by said apparatus, means actuated by a received pulse to return an energy pulse to said apparatus after a predetermined and adjustable time interval, means to regulate the intensity of the returned pulse to the minimum valued thereof detectable by said apparatus, and means determining the relative values of transmitted and returned energy whereby the ratio between the transmitted energy and the minimum detectable energy received by said echo-ranging apparatus may be established.

8. A device to determine the relative efficiency of an echo-ranging apparatus including means to receive and measure an energy pulse transmitted by said apparatus, means actuated by a received pulse to return an energy pulse to said apparatus and to first said means, means to adjust the duration of said returned pulse, means to regulate the intensity of the returned pulse until barely detectable by said apparatus, and means for comparing relative magnitudes of received and returned pulses, whereby the ratio between the transmitted energy and the minimum detectable energy received by said echo-ranging apparatus may be established.

References Cited in the file of this patent

UNITED STATES PATENTS 2,456,598     Schuck _____ Dec. 14, 1948